United States Patent [19]
Goto et al.

[11] Patent Number: 5,757,768
[45] Date of Patent: May 26, 1998

[54] VT PATH MISCONNECTION AVOIDANCE METHOD IN THE EVENT OF SONET FAILURES WITHOUT CAUSING UNCLEARED AU SQUELCH

[75] Inventors: Masataka Goto, Tokyo; Tohru Suzuki, Miyagi, both of Japan

[73] Assignee: NEC Corporation, Tokyo, Japan

[21] Appl. No.: 671,674

[22] Filed: Jun. 28, 1996

[30] Foreign Application Priority Data

Jun. 28, 1995 [JP] Japan ................................. 7-161945

[51] Int. Cl.$^6$ ................................................. H04L 12/437
[52] U.S. Cl. ........................... 370/222; 370/248; 370/406
[58] Field of Search ................................. 370/216, 221, 370/222, 223, 224, 241, 242, 243, 245, 248, 249, 252, 217, 218, 406, 250, 251, 907, 389, 400; 340/825.05; 395/181, 182.01, 182.02

[56] References Cited

U.S. PATENT DOCUMENTS

| | | | |
|---|---|---|---|
| 5,282,200 | 1/1994 | Dempsey et al. | 370/245 |
| 5,412,652 | 5/1995 | Lu | 370/223 |
| 5,442,620 | 8/1995 | Kremer | 370/223 |
| 5,537,393 | 7/1996 | Shioda et al. | 370/223 |
| 5,590,117 | 12/1996 | Iida et al. | 370/248 |

*Primary Examiner*—Alpus H. Hsu
*Assistant Examiner*—Kwang B. Yao

*Attorney, Agent, or Firm*—Sughrue, Mion, Zinn, Macpeak & Seas, PLLC

[57] ABSTRACT

Idle frames are transmitted from first and second nodes of ring network in response to a first link failure, and protection switching is performed to form a first loop between the first and second nodes via at least a third node on receiving idle frames and Bridged & Switched frames are transmitted to the first loop. At the third node, AU (administrative unit) squelching is performed in response to a second link failure in the first loop, and protection switching is performed at the third node to form a second loop between the second and third nodes, and VT squelch is performed at the third node and busy indication frames are sent from the third node to the second node until the VT (virtual tributary) squelch is completed. From the third node to the second node, Bridged & Switched frames are transmitted and the AU squelch is cleared upon completion of the VT squelch. At the second node, AU squelching is performed in response to the busy indication frames from the third node, and AT squelch is cleared in response to the Bridged & Switched frames from the third node. Alternatively, the third node performs AU squelching in response to the second link failure and performs protection switching to form a second loop between the first and third nodes, and transmits Bridged & Switched frames to the first node. In response, the first node performs AU squelching, performs VT squelching and transmits busy indication frames to the third node until VT squelching is completed, and dears the AU squelch upon completion of the VT squelching. The third node responds to the Bridged & Switched frames from the first node for clearing the AU squelch.

5 Claims, 5 Drawing Sheets

VT PATH MISCONNECTION AVOIDANCE METHOD IN THE EVENT OF SONET FAILURES WITHOUT CAUSING UNCLEARED AU SQUELCH

BACKGROUND OF THE INVENTION

1. Field of the Invention

The present invention relates generally to synchronous optical networks and more specifically to a method for avoiding misconnection of traffic in virtual tributary paths terminated to one or more nodes of a dual ring network in the event of a node failure or double link failures.

2. Description of the Related Art

In a dual ring synchronous optical network (SONET), misconnection of traffic in virtual tributary paths is likely to occur in the event of a node failure or failures that occur simultaneously at two separate links of the network. When a failure occurs in the network, idle indication frames are transmitted from nodes adjacent to the fault location and switching is performed at these adjacent node to form a recovery loop and Bridged & Switched indication frames are transmitted to the recovery loop by setting the K1/K2 byte of the section overhead of the frame. These frames indicate that the network is currently using a recovery loop and needs attention by maintenance personnel. If a subsequent failure occurs in the recovery loop, a misconnection of traffic is likely to occur. In response to the occurrence of the subsequent failure, AU squelching is performed by replacing the traffic data of an administrative unit of the STS (synchronous transport signal) frame with an alarm indication signal (AIS) and protection switching is performed to divide the failed recovery loop into separate loops. In response to the protection switching, Bridged & Switched indication frames are also transmitted through the separate loops. VT squelching is also performed at nodes where a virtual tributary (VT) path is terminated by replacing the traffic data of the VT path. The AU squelch must be cleared and its traffic restored after the VT squelching is completed. However, the nodes performing the VT squelch pass through the Bridged & Switched frames circulating the separate loops. As a result, the K1/K2 status of these frames remains unchanged even though the VT squelch is completed, and hence the AU squelch remains uncleared indefinitely due to the lack of a transition from the Bridged & Switched status indication.

SUMMARY OF THE INVENTION

It is therefore an object of the present invention to provide a method for avoiding virtual tributary path misconnection without causing uncleared AU squelch.

According to a broader aspect, the present invention provides a method for avoiding misconnection of traffic in the virtual tributary (VT) path in a dual ring synchronous optical network (SONET formed by a plurality of nodes interconnected by duplicated links, wherein a synchronous frame is transported through the network, the frame assembling traffic data of a virtual tributary path as part of traffic data of an administrative unit. In response to a failure in the network which can result in a misconnection of traffic in the VT path, the traffic data of the administrative unit is replaced with an alarm indication signal at a first node of the network, protection switching is performed to form at least one recovery loop between the first node and a second node and Bridged & Switched indication frames are transmitted from the first node to the recovery loop. The traffic data of the VT path is replaced with an alarm indication signal at any of the nodes of the network where the VT path is terminated and busy indication frames are transmitted to the recovery loop until the replacement of the traffic data of the VT path is completed. At the first node, the traffic data of the administrative unit is restored in response to a change from the busy indication frames to the Bridged & and Switched indication frames sent from one of the VT-path terminating nodes.

By the transmission of the busy indication frames form nodes performing VT squelching (the replacement of the VT traffic with the alarm indication signal), nodes which performed AU squelch (the replacement of the AU traffic with the alarm indication signal) are able to recognize a change in the status of frames from busy indication to Bridged & Switched status when the VT squelching is completed at other nodes and use this change as an appropriate timing point for clearing the AU squelch.

According to a first specific aspect of the present invention, there is provided a method for avoiding misconnection of traffic in a virtual tributary (VI) path in the event of a node failure occurring in a dual ring synchronous optical network (SONET), where the network includes a plurality of nodes interconnected by duplicated links in a ring structure for transporting a synchronous frame which assembles traffic data of the VT path as part of traffic data of an administrative unit according to digital hierarchy. The method comprises the steps of:

a) transmitting idle indication frames from first and second nodes to the network in response to a node failure occurring at a point adjacent to the first and second nodes.

b) replacing, at a third node where the VT path is terminated, the traffic data of the VT path with an alarm indication signal in response to the idle indication frames and transmitting busy indication frames until the replacement of the traffic data of the VT path is completed;

c) performing at the first and second nodes, in response to the busy indication frames from the third node, protection switching to form a loop through the first, third and second nodes and replacing the traffic data of the administrative unit with an alarm indication signal and transmitting Bridged & Switched indication frames to the third node;

d) receiving, at the third node, the Bridged & Switched indication frames from the first and second nodes while the replacement of the traffic data of the VT path is in progress and transmitting, from the third node to the first and second nodes, Bridged & and Switched indication frames upon completion of the replacement of the traffic data of the VT path at the third node; and e) restoring, at the first and second nodes, the traffic data of the administrative unit in response to the Bridged & Switched indication frames from the third node.

According to a second specific aspect of the present invention, there is provided a method for avoiding misconnection of traffic in a virtual tributary (VT) path in the event of double link failures occurring in a dual ring synchronous optical network (SONET), where the network includes a plurality of nodes interconnected by duplicated links in a ring structure for transporting a synchronous frame which assembles traffic data of the VT path as part of traffic data of an administrative unit according to digital hierarchy. The method comprises the steps of:

a) transmitting, from first and second nodes, idle indication frames to the network in response to a first link failure occurring at a point adjacent to first and second nodes, and performing protection switching to form a first loop between the first and second nodes via at least a third node in response to receipt of idle indication frames and transmitting Bridged & Switched indication frames to the first loop;

b) replacing, at the third node, the traffic data of the administrative unit with an alarm indication signal, in response to a second link failure in the first loop, performing protection switching, at the third node, to form a second loop between the second and third nodes, and replacing, at the third node, the traffic data of the VT path with an alarm indication signal, transmitting busy indication frames from the third node to the second node until the replacement of the traffic data of the VT path is completed, and transmitting from the third node to the second node Bridged & Switched indication frames and restoring the traffic data of the administrative unit upon completion of the replacement of the traffic data of the VT path; and c) replacing, at the second node, the traffic data of the administrative unit with an alarm indication signal in response to the busy indication frames from the third node, and restoring the traffic data of the administrative unit in response to the Bridged & Switched indication frames from the third node.

Alternatively, the step (a) is followed by the steps of:

b) replacing, at the third node, the traffic data of the administrative unit with an alarm indication signal in response to a second link failure in the first loop, performing protection switching, at the third node, to form a second loop between the first and third nodes, and transmitting from the third node to the first node Bridged & Switched indication frames;

c) replacing, at the first node, the traffic data of the administrative unit with an alarm indication signal in response to the Bridged & Switched indication frames from the third node, replacing the traffic data of the VT path with an alarm indication signal, transmitting busy indication frames from the first node to the third node until the replacement of the traffic data of the VT path is completed, and restoring the traffic data of the administrative unit upon completion of the replacement of the traffic data of the VT path; and d) restoring, at the third node the traffic data of the administrative unit in response to the Bridged & Switched indication frames from the first node.

BRIEF DESCRIPTION OF THE DRAWINGS

The present invention will be described in further detail with reference to the accompanying drawings, in which.

DETAILED DESCRIPTION

Figure 1:
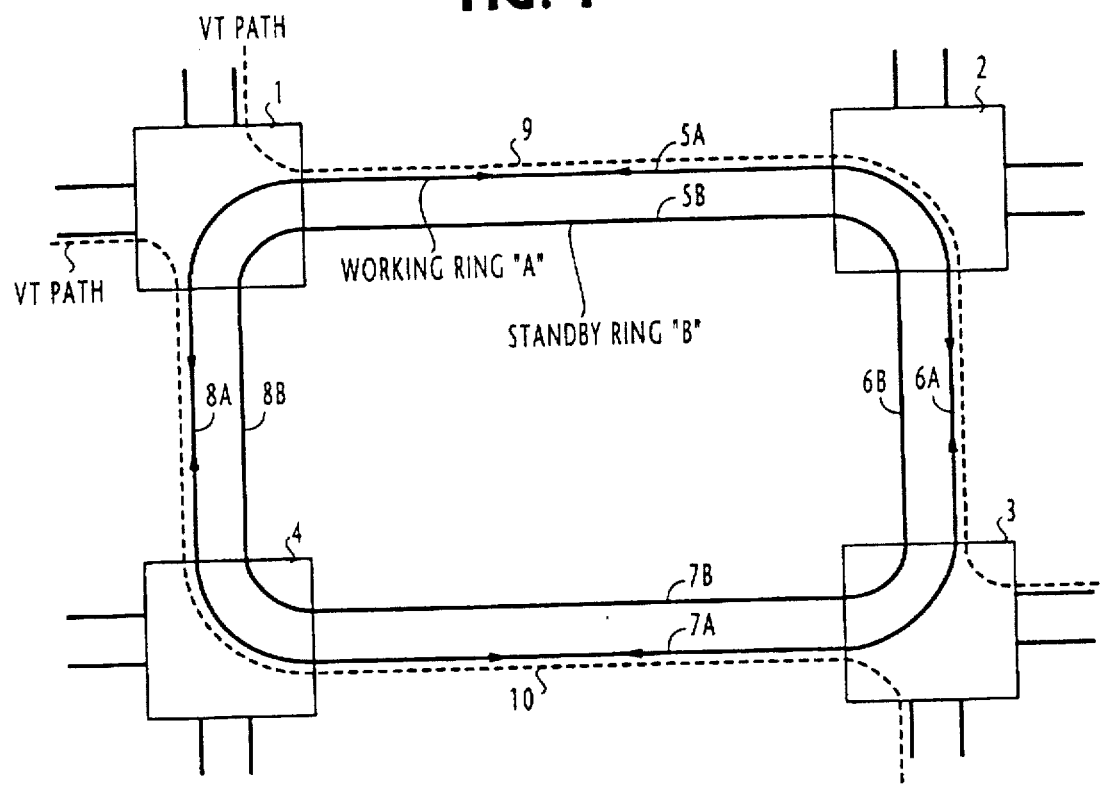
FIG. 1 is a simplified block diagram of a dual ring synchronous optical network.

Referring now to FIG. 1, a simplified SONET (synchronous optical network) dual ring network is illustrated. This network is composed of nodes 1 to 4 interconnected by optical links (or spans) in a ring structure. These network nodes may comprise add/drop multiplexers or digital cross-connect systems, or a mixture of these network elements. As illustrated, nodes 1 and 2 are connected by a pair of optical fibers 5A, 5B, nodes 2 and 3 being connected by a pair of optical fibers 6A, 6B, nodes 3 and 4 by optical fibers 7A, 7B and nodes 4 and 1 by optical fibers 8A, 8B. Under normal condition, optical fibers 5A, 6A, 7A and 8A are connected to form a working route 9 and optical fibers 5B, 6B, 7B and 8B are connected to form a protection route 10. From other network nodes, not shown, optical fibers are terminated at network nodes 1 to 4 for connection to the working route 9. Incoming virtual tributary signals from outside of the network are added at an entering node to the signal such as STS-1 (synchronous transport signal-level 1) frame which is circulating through the ring network and dropped from the ring at an exit node. For purposes of disclosure, two virtual tributary paths 9 and 10 are illustrated. VT path 9 extends through nodes 1, 2 and 3 and VT path 10 extends dough nodes 1, 4 and 3. For both of these VT paths, nodes 1 and 3 are terminating nodes and nodes 2 and 4 function as intermediate nodes.

Each network node is provided with a ring topology map and a squelch table. When a fault occurs in the working route A, adjacent nodes on the opposite sides of the fault location transmit an alarm signal. Specifically, the alarm signal is sent by setting an "idle" status code and the identifiers of the source and failed nodes into the K1/K2 byte of the section overhead (SOH) of STS-1 frames transported in the ring network. On receiving an alarm signal, each node analyzes the node identifiers contained therein and consults with the ring topology map and the squelch table to determine what actions to take.

Figure 2:
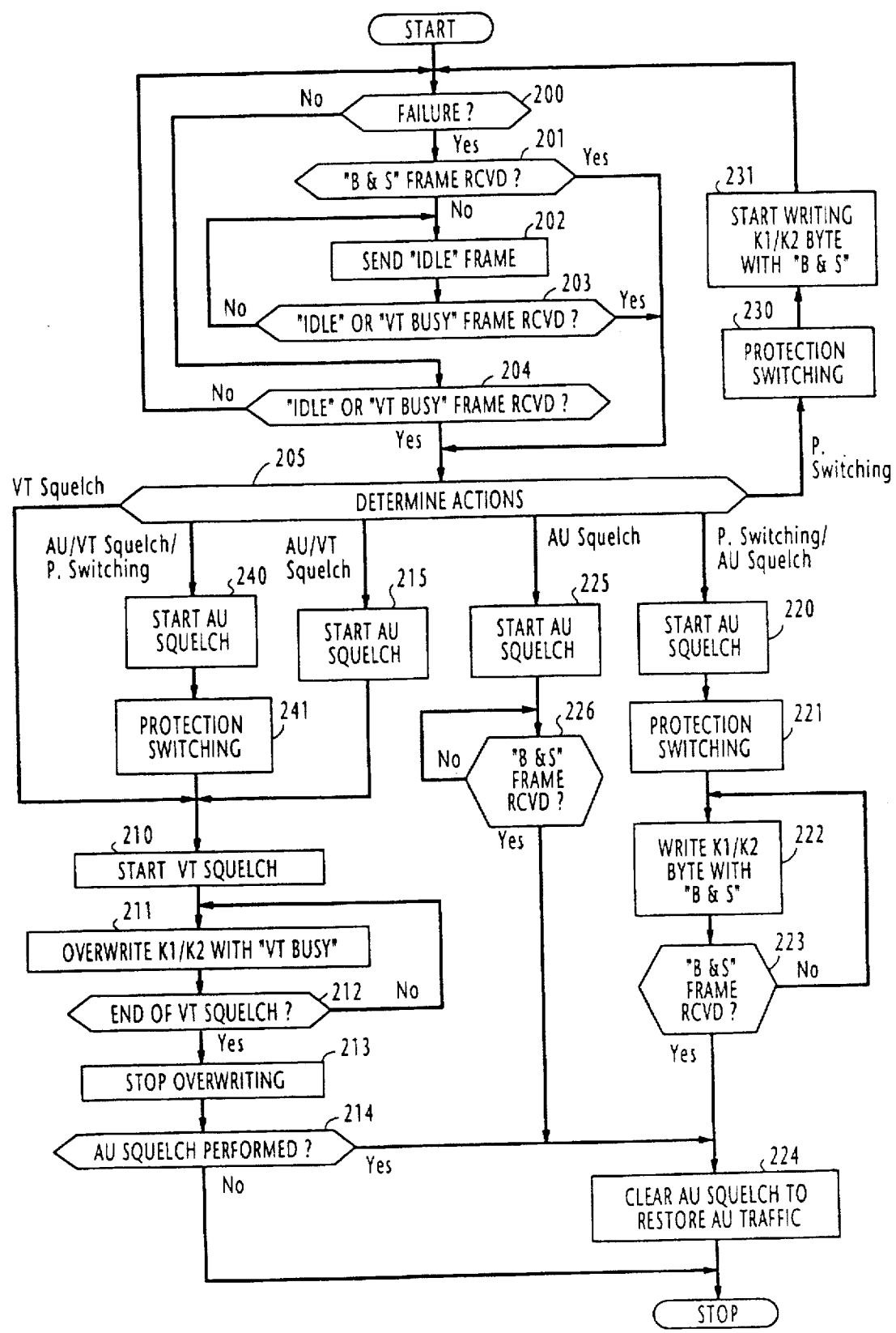
FIG. 2 is a flowchart illustrating the operation of each node in the ring network according to the present invention.

As illustrated in FIG. 2, each of the network nodes is programmed to perform ring protection switching, squelching (replacing traffic with all binary ones) or a mixture of these in the event of a failure in the ring network.

When a failure occurs in the ring network (step 200), control flow of the program at each node proceeds to step 201 to determine whether the node is receiving "bridged & switched" status indicating frames. If this is the case, the network has experienced a failure and protection switching has occurred in one or more of the network nodes, and flow proceeds to decision step 205, recognizing that a second failure has occurred. If the decision at step 201 is negative, it is determined that the failure detected at step 200 is the first one and flow proceeds to step 202 to send an idle frame by setting the K1/K2 byte of the section overhead of an incoming STS frame with an idle status indication and the identifiers of the source and failed nodes. Note that the information given by the K1/K2 byte always contains the identifiers of the source node and a destination (or failed) node regardless of the type of status indication. Flow proceeds to step 203 to check for the reception of an idle frame or a VT busy frame which will be described. If any of these frames is not received from other nodes. On receiving an idle frame, every node on the ring network relays it downstream, so the reception of an idle frame after transmission of an idle frame from a node allows it to determine the location of the fault. If the decision of step 203 is affirmative, flow proceeds to decision step 205. If no failure is detected at step 200, flow proceeds to step 204 to check to see if an idle or VT busy frame is received. If not, flow returns to step 200. If the decision of step 204 is affirmative in a given node, it is determined that a failure has occurred in a link or node which is not adjacent to the given node, and flow proceeds to decision step 205.

Since protection switching, AU and VT squelching operations are all the types of actions to be taken by a node concerned, one of six possible cases must be considered for the node, i.e., (1) a combination of these three operations, (2) a combination of protection switching and AU squelching, (3) a combination of AU squelching and VT squelching, (4) protection switching, (5) AU squelching and (6) VT squelching. Since protection switching in a node must accompany AU squelching if misconnection of traffic can occur on a virtual tributary path, it is not necessary to consider the case of a combination of protection switching and VT squelching. At step 205, one of the six cases is identified by using the node identifiers contained in the idle frames.

Figure 3:
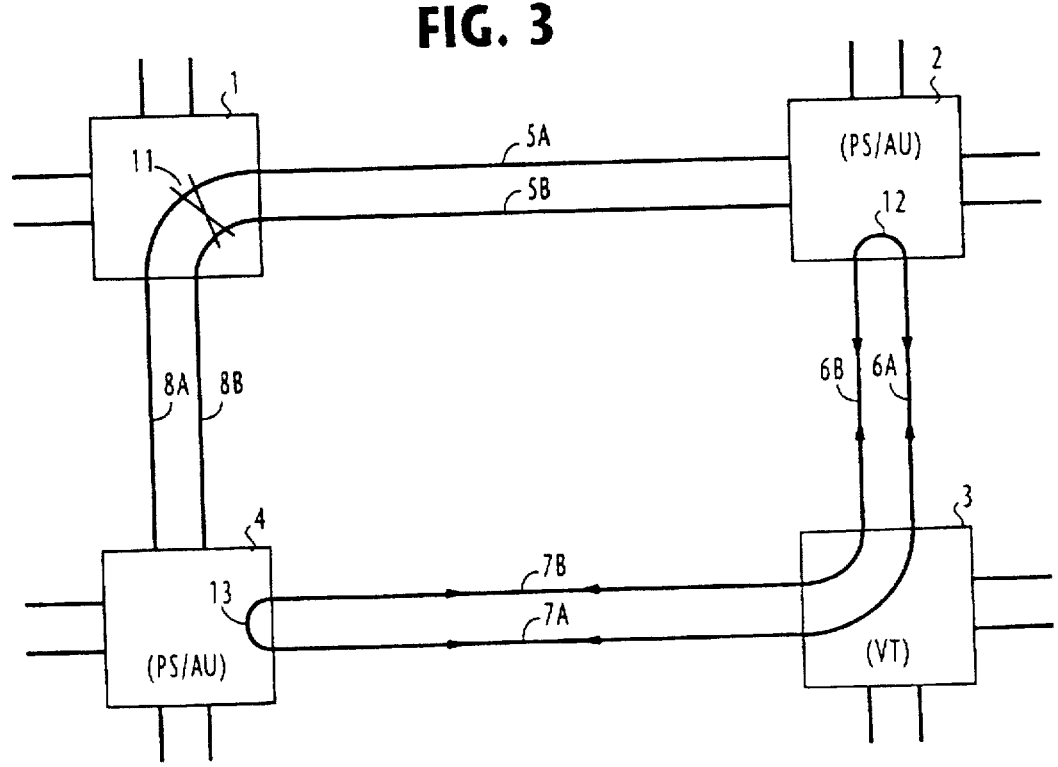
FIG. 3 is a block diagram of the ring network showing a bridged loop when a node failure occurred.
Figure 4:
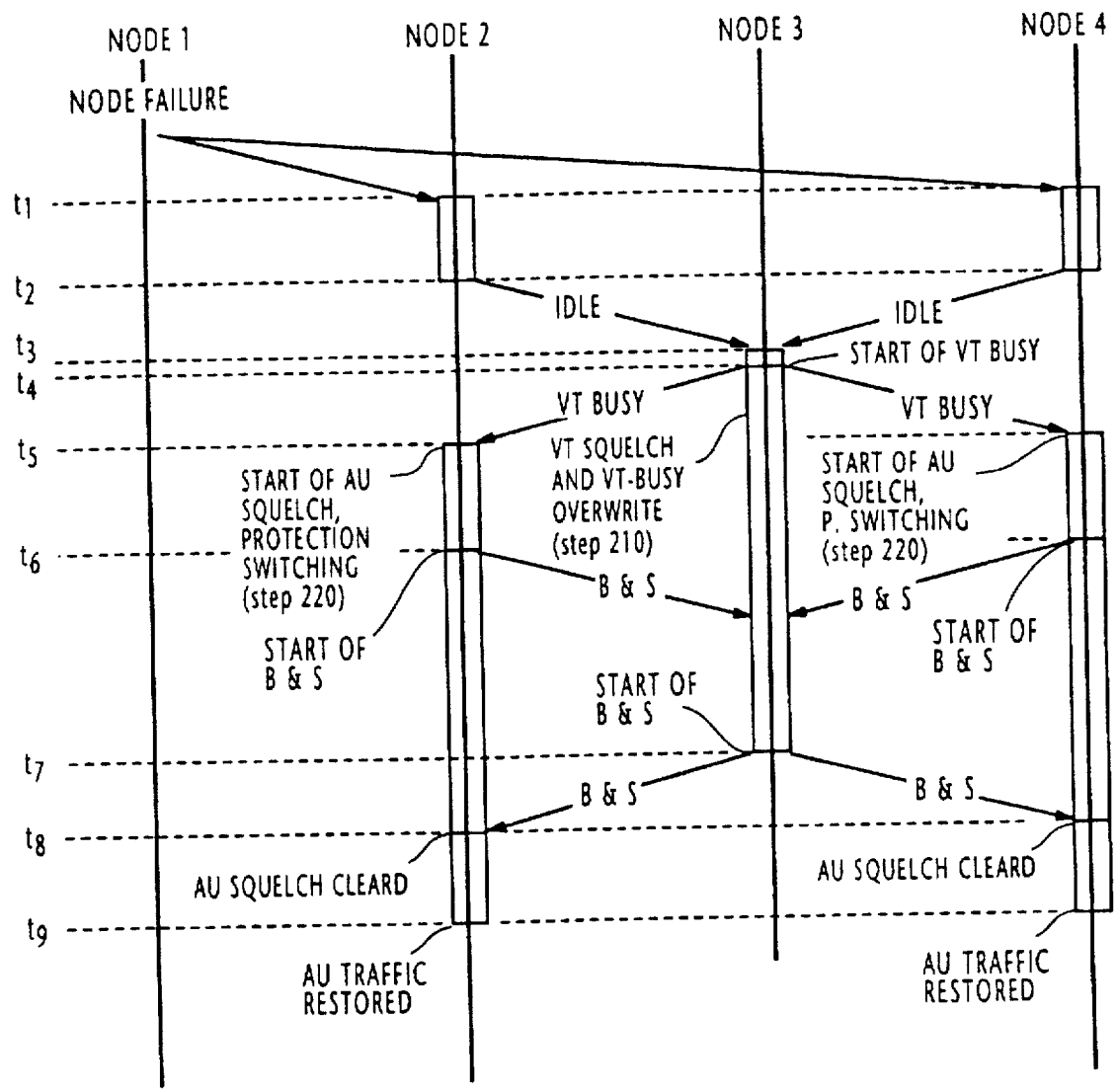
FIG. 4 is a sequence diagram for describing the flow of status indications carried by the K1/K2 byte of the section overhead of STS frames associated with the node failure of FIG. 3.

Program execution of FIG. 2 at each node of the network will be further explained with reference to a sequence diagram shown in FIG. 4 by assuming that a node failure has occurred in node 1 as shown at 11 in FIG. 3, causing double failures in virtual tributary paths 9 and 10. In such situation, protection switching and AU squelching are necessary at nodes 2 and 4 by replacing the higher level traffic that contains the failed virtual tributary paths with the appropriate AIS, while VT squelching is necessary at the VT terminating node 3 by replacing the traffic of the virtual tributary paths with the appropriate AIS.

At time $t_1$, nodes 2 and 4 recognize that a failure has occurred in a direction toward node 1 (step 200). Since no "bridged & switched" frame has been received before, each of these nodes proceeds from step 201 to step 202 to send an "idle" frame to node 3 at time $t_2$ by setting its K1/K2 byte to the idle state, while node 3 is repeatedly executing steps 200 and 204.

At time $t_3$, node 3 responds to the idle frames from nodes 2 and 4, and exits the loop and enters decision step 205 where it analyzes the received idle frames by consulting with the ring map and the tributary table and determines an appropriate action to take. Since node 3 is the terminating node for the failed virtual tributary paths 9 and 10, it recognizes that misconnections of traffic are likely to occur, and determines that VT squelching is necessary for virtual tributary paths 9 and 10, but there is no need for protection switching and AU squelching. Based on this determination, node 3 proceeds from step 204 to step 210 to start performing VT squelching. Node 3 then proceeds to step 211 to start overwriting the K1/K2 status of the section overhead of each incoming STS-1 frame with a "VT busy" indication code and starts transmitting the VT busy frame to nodes 2 and 4 at time $t_4$, while at the same time detecting the end of the VT squelching by repeatedly executing step 212. This VT-busy frame indicates that VT squelching is being performed at node 3.

After transmitting idle frames at time $t_2$, nodes 2 and 4 are executing step 203 to determine whether an idle or VT busy frame is received and continues sending the idle frames. At time $t_5$, nodes 2 and 4 respond to the VT busy frames from node 3 and proceed from step 203 to decision step 205 where they determine that protection switching and AU squelching are necessary, and proceed to step 220 to start AU squelching and performs protection switching (step 221). As a result, the administrative unit traffic data transported via nodes 2 and 4 are replead by the appropriate AIS and links 6A and 6B are bridged together at 12 by node 2 and links 7A and 7B are bridged together at 13 by node 4 as illustrated in FIG. 3, forming a loop between nodes 2 and 4 via node 3. Nodes 2 and 4 then proceed to step 222 to write the K1/K2 byte with the "Bridged & Switched" status code and start transmitting "bridged and switched (B & S)" frames to node 3 at time $t_6$.

Meanwhile, node 3 is performing the VT squelching (step 211) when it receives the "B & S" status indication frames. Node 3 thus overwrites the "B & S" status indication of these frames with the VT busy indication code. When node 3 ends the VT squelching at time $t_7$, it proceeds from step 212 to step 213 to stop the overwriting of the B & S status with the VT busy status code. As a result, the K1/K2 status byte changes, at node 3, from VT busy indication to "B & S" indication, and node 3 starts sending "B & S" frames to nodes 2 and 4 at time $t_7$, while nodes 2 and 4 are executing step 223 to check for the reception of a "B & S" frame to discontinue the transmission of "B & S" frames. Node 3 proceeds to step 214 to check to see if AU squelching was performed. Since no AU squelching was performed at node 3, flow proceeds to the end of the program.

In response to the "B & S" frames, nodes 2 and 4 stops sending the "B & S" frames at step 223 and proceed, at time $t_8$, to step 224 to clear the AU squelching to restore the traffic of their administrative units at time $t_9$. In this way, the present invention avoids misconnection of traffic which would otherwise occur in the presence of a node failure in a four-node ring network.

Figure 5A:
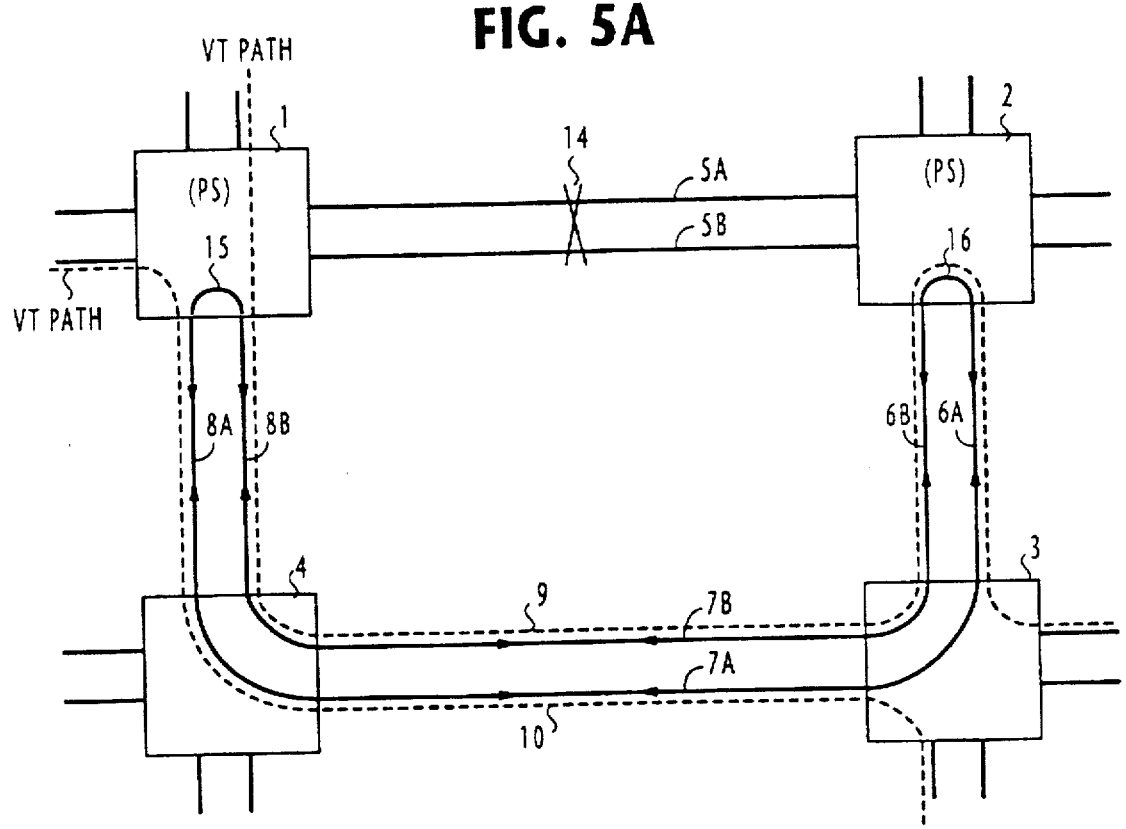
FIG. 5A is a block diagram of the ring network showing a bridged loop when a link failure first occurred.
Figure 5B:
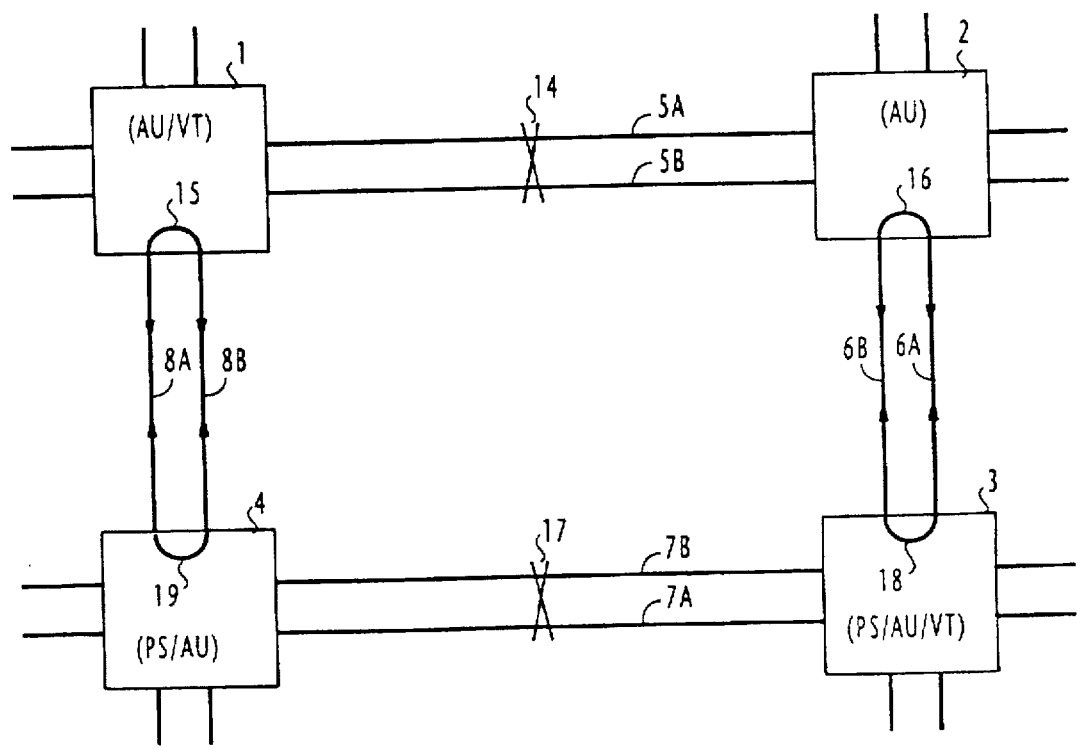
FIG. 5B is a block diagram of the ring network showing bridged loops when a subsequent link failure occurred.
Figure 6:
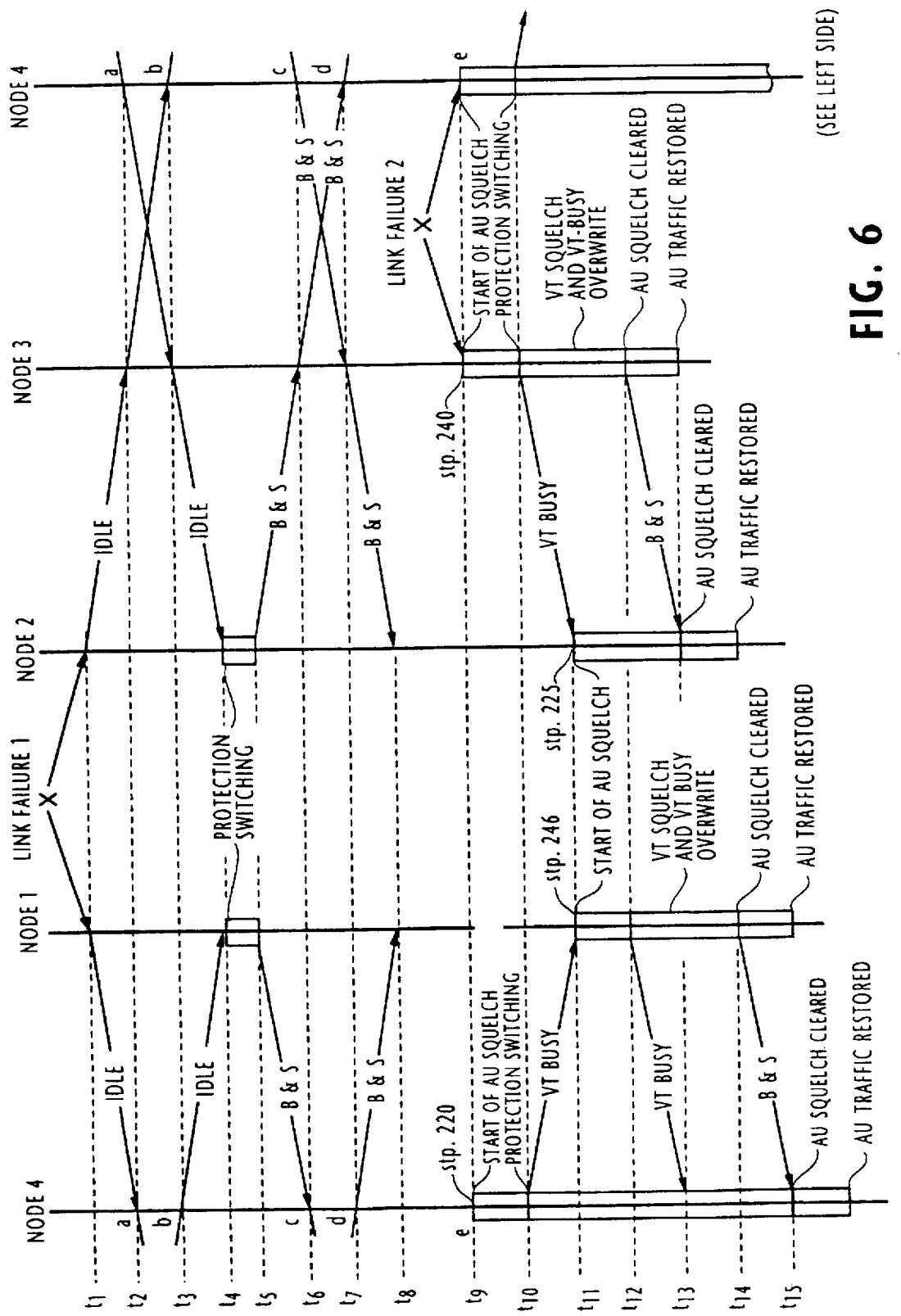
FIG. 6 is a sequence diagram for describing the flow of status indications carried by the K1/K2 byte of the section overhead of STS frames associated with the link failures of FIGS. 5A and 5B.

Misconnection is also likely to occur when two links of a ring network have failed simultaneously. FIG. 5A shows a first cable cut at point 14 on working and protection links 5A and 5B between adjacent nodes 1 and 2. FIG. 5B shows a subsequent cable cur at point 17 on working and protection links 7A and 7B between adjacent nodes 3 and 4. In the latter case, both of the virtual tributary paths 9 and 10 fail, and the digital higher level signals, i.e., the administrative unit of the STS frame that contains the failed virtual tributary paths must be squelched at all nodes of the network by replacing its traffic with an alarm indication signal (all bit ones) and virtual tributary traffic must also be squelched at the VT terminating nodes 1 and 3.

The description of the actions taken by the nodes in response to this type of successively occurring failures will be explained with reference to FIGS. 2, 5A, 5B and 6.

The occurrence of the first cable cut at point 14, FIG. 5A, is detected by the adjacent nodes 1 and 2 at time $t_1$ (FIG. 6), and nodes 1 and 2 proceed from step 200 to step 201. Since no "B & S" frames are generated in the network, nodes 1 and 2 proceed from step 201 to step 202 to start sending idle frames and check for the reception of an idle frame from nodes 2 and 1, respectively. The idle frames from nodes 1 and 2 are first received by nodes 4 and 3, respectively, at time $t_2$ and then relayed downstream at time $t_3$. Nodes 1 and 2 respectively receive the idle frames of nodes 2 and 1 at time $t_4$ to stop sending the idle frames and proceed from step 203 to step 205. Using the node identifiers contained in the received idle frames, nodes 1 and 2 determine that no misconnection can occur and that protection switching is all what is required to save the situation and proceed from step 205 to step 230 to perform protection switching by bridging links 8A and 8B (as shown at 15) in node 1 and bridging links 6A and 6B (as indicated at 16) in node 2 as illustrated in FIG. 5A, while switching the virtual tributary path 9 from link 5A to link 8B at node 1. Nodes 1 and 2 proceed to step 231 to start writing the K1/K2 byte with the "B & S" status indication so that transmission of "B & S" frames from node 1 to node 4 and from node 1 to node 3 is started at time $t_5$. After transmission of a "B & S" frame, flow at nodes 1 and 2 returns to step 200.

The "B & S" frames sent from nodes 1 and 2 are relayed, at time $t_6$, through nodes 4 and 3 and received by nodes 2 and 1 at time $t_7$. These "B & S" frames are continuously circulated along the loop formed between nodes 1 and 2 via intermediate nodes 3 and 4, as illustrated in FIG. 5A, as long as the cable failure at point 14 is not restored.

When the second cable cut subsequently occurred at point 17, FIG. 5B, and detected by adjacent nodes 3 and 4 at time $t_9$ (FIG. 6), nodes 3 and 4 proceed from step 200 to step 201. Since "B & S" frames are being received at time $t_7$, nodes 3 and 4 proceed from step 201 to step 205 to determine actions to take.

Since node 3 is the terminating node for virtual tributary path 10, it determines that VT squelching and protection switching are necessary in addition to AU squelching and proceeds from step 205 to step 240 to start AU squelching and performs protection switching (step 241) so that links 6A and 6B are bridged together at a point 18 in node 3 to form a loop between nodes 2 and 3 (FIG. 5B). Node 3 proceeds to step 210 to start VT squelching and, at step 211, overwrites the K1/K2 byte of incoming frames with the VT busy status indication until the end of VT squelch is detected at step 212, whereupon the K1/K2 overwriting (step 211) is terminated. As a result, node 3 begins sending "VT busy" frames at time $t_{10}$ and continues VT squelching and K1/K2 overwriting until time $t_{12}$.

The forming of the loop between nodes 2 and 3 allows them to continue exchanging "B & S" frames. Therefore, the cessation of the K1/K2 overwriting with the VT busy indication at node 3 automatically restores the status indication of the frames from node 3 to "Bridged & Switched" status, and a continued transmission of "B & S" frames from node 3 is restarted at time $t_{12}$. Node 3 then proceeds from step 213 to step 214 to determine whether AU squelching was performed. Since AU squelching was performed, flow proceeds to step 224 to clear the AU squelching to restore the AU traffic at time $t_{13}$.

On the other hand, node 4 determines, at step 205, that AU squelching and protection switching are necessary, but no VT squelching is required, and executes step 220 through step 224. As a result, links 8A and 8B are bridged together at a point 19 in node 4 to form a loop between nodes 1 and 4 (FIG. 5B).

Prior to the protection switching at nodes 3 and 4, nodes 1 and 2 are exchanging "B & S" frames with nodes 4 and 3, respectively. Since nodes 1 and 2 are executing steps 200 and 204 to check for the receipt of a VT busy frame and since VT busy frames were transmitted at time $t_{10}$ from nodes 4 and 3, nodes 1 and 2 receive these frames at time $t_{11}$ and proceed from step 204 to step 205. In this case, the VT terminating node 1 determines that VT squelching is necessary in addition to AU squelching. Node 1 proceeds from step 205 to step 215 to start AU squelching at time $t_{11}$ and then performs VT squelching by executing steps 210 to 213 during times $t_{12}$ and $t_{14}$ and advances to step 224 to clear the AU squelching. At time $t_{14}$, VT-busy overwrite stop command step 213 is executed. The cessation of the K1/K2 overwriting with the VT busy indication at node 1 automatically restores the status indication of its frames to the "Bridged & Switched" status, and a continued transmission of "B & S" frames from node 1 is restarted at time $t_{11}$. Node 1 then proceeds from step 213 through step 214 to step 224 to clear the AU squelching to restore the AU traffic at time $t_{15}$. On the other hand, node 4 responds at time $t_{15}$ to the VT bus frame from node 1 by clearing its AU squelch to restore its AU traffic.

Whereas, node 2 determines that AU squelching is the only action to take since it is not terminating any of the failed virtual tributary paths. Node 2 thus proceeds from step 205 to step 225 to start AU squelching at time $t_{11}$. This AU squelching is continued until time $t_{13}$, at which time node 2 starts receiving "B & S" frames from node 3 (step 226). Node 2 then proceed from step 226 to step 224 to clear the AU squelching to restore its AU traffic.

It will be seen that, by the overwriting of the K1/K2 byte of frames with an indication (i.e., VT busy) that VT squelching is being performed each node receiving such a frame-can utilize the transition of K1/K2 status from VT busy to "bridged & switched" as a timing point for clearing AU squelching to restore traffic.

What is claimed is:

1. In a dual ring synchronous optical network (SONET) formed by a plurality of nodes interconnected by duplicated links, wherein a synchronous frame is transported through the network, said frame assembling traffic data of a virtual tributary path as part of traffic data of an administrative unit, a method for avoiding misconnection of traffic in the virtual tributary (VT) path is provided, the method comprising the steps of:

replacing the traffic data of the administrative unit with an alarm indication signal at a first node of the network in response to a failure in the network which can result in misconnection of traffic in the VT path, performing protection switching to form at least one recovery loop between the first node and a second node and transmitting Bridged & Switched indication frames to the recovery loop;

replacing the traffic data of the VT path with an alarm indication signal at any of the nodes of the network where the VT path is terminated and transmitting busy indication frames to the recovery loop until the replacement of the traffic data of the VT path is completed; and restoring, at the first node, the traffic data of the administrative unit in response to a change from the busy indication frames to the Bridged & and Switched indication frames sent from any of the VT-path terminating nodes.

2. A method for avoiding misconnection of traffic in a virtual tributary (VT) path in the event of a node failure occurring in a dual ring synchronous optical network (SONET), where the network includes a plurality of nodes interconnected by duplicated links in a ring structure for transporting a synchronous frame which assembles traffic data of said VT path as part of traffic data of an administrative unit according to digital hierarchy, the method comprising the steps of:

a) transmitting idle indication frames from first and second nodes (2, 4) to the synchronous optical network (SONET) in response to a node failure occurring at a point adjacent to the first and second nodes;

b) replacing, at a third node (3) where said VT path is terminated, the traffic data of the VT path with an alarm indication signal in response to the idle indication frames and transmitting, at the third node (3), busy indication frames until the replacement of the traffic data of the VT path is completed;

c) responsive to the busy indication frames from the third node, performing, at said first and second nodes (2, 4), protection switching to form a loop through said first, third and second nodes (2, 3, 4) and replacing the traffic data of the administrative unit with an alarm indication signal and transmitting Bridged & Switched indication frames to the third node;

d) receiving, at the third node (3), the Bridged & Switched indication frames from the first and second nodes while the replacement of the traffic data of the VT path is in progress and transmitting, from the third node to the first and second nodes, Bridged & and Switched indication frames upon completion of the replacement of the traffic data of the VT path at the third node; and e) restoring, at said first and second nodes (2, 4), the traffic data of the administrative unit in response to the Bridged & Switched indication frames from the third node (3).

3. A method for avoiding misconnection of traffic in a virtual tributary (VT) path in the event of double link failures occurring in a dual ring synchronous optical network (SONET), where the network includes a plurality of nodes interconnected by duplicated links in a ring structure for transporting a synchronous frame which assembles traffic data of said VT path as part of traffic data of an administrative unit according to digital hierarchy, the method comprising the steps of:

a) responsive to a first link failure occurring at a point adjacent to first and second nodes (1, 2), transmitting, from first and second nodes, idle indication frames to the network and performing protection switching to form a first loop between said first and second nodes (1, 2) via at least a third node (3) in response to receipt of said idle indication frames and transmitting Bridged & Switched indication frames to the first loop;

b) responsive to a second link failure in said first loop, replacing, at the third node (3), the traffic data of the administrative unit with an alarm indication signal, performing protection switching, at the third node (3), to form a second loop between the second and third nodes (2, 3), and replacing, at the third node (3), the traffic data of the VT path with an alarm indication signal, transmitting busy indication frames from the third node (3) to the second node (2) until the replacement of the traffic data of the VT path is completed, and transmitting from the third node (3) to the second node (2) Bridged & Switched indication frames and restoring at the third node the traffic data of the administrative unit upon completion of the replacement of the traffic data of the VT path; and c) responsive to the busy indication frames from the third node (3), replacing, at the second node (2), the traffic data of the administrative unit with an alarm indication signal, and restoring the traffic data of the administrative unit in response to the Bridged & Switched indication frames from the third node.

4. A method for avoiding misconnection of traffic in a virtual tributary (VT) path in the event of double link failures occurring in a dual ring synchronous optical network (SONET), where the network includes a plurality of nodes interconnected by duplicated links in a ring structure for transporting a synchronous frame which assembles traffic data of said VT path as part of traffic data of an administrative unit according to digital hierarchy, the method comprising the steps of:

a) responsive to a first link failure occurring at a point adjacent to first and second nodes (1, 2), transmitting, from first and second nodes, idle indication frames to the network and performing protection switching to form a first loop between said first and second nodes via at least a third node (4) in response to receipt of said idle indication frames and transmitting Bridged & Switched indication frames to the first loop;

b) responsive to a second link failure in said first loop, replacing, at said third node (4), the traffic data of the administrative unit with an alarm indication signal, performing protection switching, at the third node (4), to form a second loop between the first and third nodes (1, 4), and transmitting from the third node (4) to the first node (1) Bridged & Switched indication frames;

c) responsive to the Bridged & Switched indication frames from the third node (4), replacing, at the first node (1), the traffic data of the administrative unit with an alarm indication signal, replacing the traffic data of the VT path with an alarm indication signal, transmitting busy indication frames from the first node (1) to the third node (4) until the replacement of the traffic data of the VT path is completed, and restoring the traffic data of the administrative unit upon completion of the replacement of the traffic data of the VT path; and d) responsive to the Bridged & Switched indication frames from the first node (1), restoring, at the third node (4) the traffic data of the administrative unit.

5. A method for avoiding misconnection of traffic in a virtual tributary (VT) path in the event of double link failures occurring in a dual ring synchronous optical network (SONET), where the network includes first, second, third and fourth nodes interconnected by duplicated links in a ring structure for transporting a synchronous frame which assembles traffic data of said VT path as part of traffic data of an administrative unit according to digital hierarchy, the method comprising the steps of:

a) transmitting, from said first and second nodes (1, 2), idle indication frames in response to a first link failure occurring between the first and second nodes, performing protection switching, at the first and second nodes, to form a first loop through said first, second, third and fourth nodes in response to receipt of the idle indication frames, and transmitting Bridged & Switched indication frames to said first loop;

b) responsive to a second link failure occurring in said first loop between said third and fourth nodes (3, 4) in the presence of the Bridged & Switched indication frames in said first loop, replacing, at said fourth node (4), the traffic data of said administrative unit with an alarm indication signal, performing protection switching, at the fourth node, to form a second loop between said first and fourth nodes (1, 4), and transmitting Bridged & Switched indication frames from the fourth node to the first node;

c) responsive to the Bridged & Switched indication frame from the fourth node (4), replacing, at said first node (1), the traffic data of said administrative unit with an alarm indication signal and replacing, at the first node, the traffic data of the said VT path with an alarm indication signal, transmitting from the first node to the fourth node busy indication frames when the traffic data of the VT path is being replaced, and transmitting Bridged & Switched indication frames from the first node to the fourth node and restoring, at the first node (1), the traffic data of the administrative unit upon completion of the replacement of the traffic data of the VT path;

d) restoring, at the fourth node, the traffic data of the administrative unit in response to a transition from the busy indication frames to the Bridged & Switched indication frames sent from the first node;

e) responsive to said second link failure, replacing, at the third node (3), the traffic data of said administrative unit with an alarm indication signal and performing protection switching, at the third node, to form a third loop between said second and third nodes (2, 3), replacing, at the third node, the traffic data of the VT path, and transmitting busy indication frames from the third node to the second node when the traffic data of the VT path is being replaced, and transmitting Bridged & Switched indication frames from the third node to the second node and restoring, at the third node (3), the traffic data of the administrative unit upon completion of the replacement of the traffic data of the VT path; and f) replacing, at said second node, the traffic data of said administrative unit with an alarm indication signal in response to the busy indication frames from the third node and restoring the traffic data of said administrative unit in response to a transition from the busy indication frames to the Bridged & Switched indication frames sent from the third node.

* * * * *